United States Patent [19]

Tosaka et al.

[11] 4,400,073
[45] Aug. 23, 1983

[54] SAFETY DEVICE FOR A CAMERA WITH A WINDING MOTOR

[75] Inventors: Yoichi Tosaka, Shakujii; Masanori Uchidoi, Yokohama; Yoshihiro Shigeta, Tokyo; Ryoichi Yoshikawa; Shosuke Haraguchi, both of Yokohama, all of Japan

[73] Assignee: Canon Kabushiki Kaisha, Tokyo, Japan

[21] Appl. No.: 295,324

[22] Filed: Aug. 24, 1981

[30] Foreign Application Priority Data

Aug. 28, 1980 [JP] Japan ................................. 55-118620

[51] Int. Cl.³ .......................... G03B 9/66; G03B 17/42
[52] U.S. Cl. ..................................... 354/173; 354/205
[58] Field of Search ............... 354/171, 173, 152, 234, 354/235, 266, 268, 246, 204–206

[56] References Cited

U.S. PATENT DOCUMENTS 4,313,658 2/1982 Sugiura et al. ................. 354/234 X Primary Examiner—William B. Perkey
Attorney, Agent, or Firm—Toren, McGeady and Stanger

[57] ABSTRACT

A camera of the type having a winding motor is provided with a timer circuit which, after the lapse of a predetermined length of time, forcibly effects a supply of power to the winding motor when the shutter blades fail to travel in a normal way, and even when a signal corresponding to shutter blade travel completion is not obtained. The winding motor then resets the camera mechanisms which are arranged to perform various operations, such as shutter charging, mirror returning and film feeding, into their respective initial states. This eliminates the possibility of trouble resulting from such a malfunction of the camera that it becomes inoperative halfway through completion of photographing operation.

8 Claims, 4 Drawing Figures

SAFETY DEVICE FOR A CAMERA WITH A WINDING MOTOR

BACKGROUND OF THE INVENTION

1. Field of the Invention

This invention relates to a camera, and more particularly to a camera of the type incorporating a motor for performing a charging operation on the internal mechanisms of the camera, such as a shutter, etc., and a film feeding operation.

2. Description of the Prior Art

In the conventional single-lens reflex camera, operations such as a releasing action on a film winding stop claw, a mirror returning action and an automatic stop quick returning action have been arranged to be mechanically performed after completion of the travel of the trailing shutter blade. The conventional arrangement, therefore, has necessitated the use of a much greater driving force for shutter charging than the driving force required for driving the shutter blades.

To eliminate this shortcoming of the conventional camera, there have been proposed various arrangements including: utilization of the strong spring force of a mirror driving spring, which must have a strong spring force to begin with, also for winding stop releasing, mirror returning and automatic quick returning actions; and use of a shutter that permits much reduction in the driving force thereon by virtue of a relatively small load it imposes on the motor.

However, with a shutter arranged to be controlled by such a small driving force, the shutter tends to give rise to the trouble that the shutter blades do not travel even when a driving signal is applied to the shutter, or that the shutter blades stop halfway during their travel. In the case of such a malfunction, no signal representative of completion of the travel of the trailing shutter blade is obtained. Therefore, the camera becomes incapable of proceeding to the next sequence of actions. Under such a condition, the mirror is left in a lifted up state, and the shutter in an open state. Then, an inadvertent film rewinding under that condition would ruin not only an unused portion of the film, but also a normally photographed portion thereof by unintentionally exposing the whole film to light. Besides, with the mirror left in the lifted up state, the shutter blades might be damaged by the sunlight.

SUMMARY OF THE INVENTION

It is an object of the invention to provide a camera which is free from the problem of having the photographed portion of the film ruined by unintended exposure to light, or another problem of having the shutter blades damaged by sunlight, even where the shutter driving force of the camera is arranged to be small.

It is another object of the invention to provide a camera which is capable of preventing all of the above stated problems.

It is a further object of the invention to provide a camera which is capable of completely preventing the occurrence of the problem that, in cases where only the trailing shutter blade travels in a normal manner while the leading shutter blade fails to travel, photographing is not actually performed at all on a plurality of film frames with photographing operations carried on under such a malfunctioning condition of the shutter.

These and further objects, features and advantages of the invention will become apparent from the following detailed description of embodiments thereof taken in connection with the accompanying drawings.

DETAILED DESCRIPTION OF THE PREFERRED EMBODIMENTS

Figure 1:
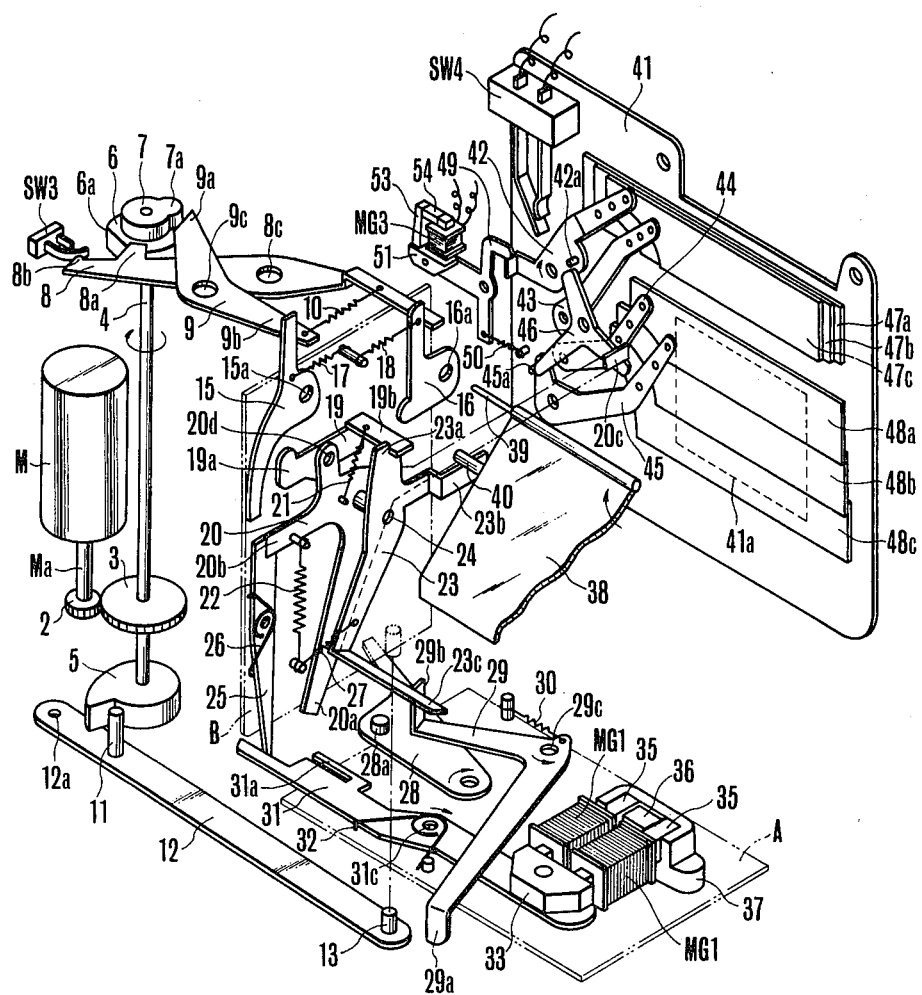
FIG. 1 is an oblique view showing the internal mechanisms of a camera to which the present invention relates.

FIG. 1 shows an example of the internal mechanisms of a camera to which the present invention relates. The illustration shows these mechanisms as in a condition of having completed a winding operation. A winding motor M has a gear 2 secured to the shaft Ma thereof. A gear 3 which is arranged to engage the gear 2 is secured to a shaft 4 together with a winding cam 5, a notched plate 6 and a cam 7. A charge lever 12 is pivotally carried by a shaft 12a and is provided with pins 11 and 13 disposed thereon. The pin 11 is arranged to engage the cam 5. A lever 9 which is pivotally carried by a shaft 9c has one end 9a thereof pushed by the cam 7. Between the other end of the lever 9 and one end of a winding lever 8, there is provided a spring 10.

The winding lever 8 is provided with a projection 8a which engages the notch 6a of the notched plate 6 to prevent the notched plate from turning. Further, under this locked condition, a normally open switch SW3 is on.

In a lens stopping-down unit A, a charge lever 28 which has a pin 28a is pivotally supported and is arranged to be rotatable. Meanwhile, a stopping-down lever 29 is pivotally supported by a shaft 29c to be rotatable thereon. A start lever 31 is also pivotally supported by a shaft 31c to be rotatable thereon.

These levers 28, 29 and 31 are urged in the directions of arrows, the lever 28 being urged by a spring which is not shown, the lever 29 by a spring 30 and the lever 31 by a spring 32 respectively. Further, in the unit A, a coil MG1, yoke 35 and a magnet 36 are fixedly positioned by a holder 37.

On the above stated start lever 31, there is pivotally provided armature 33 which is attracted by the yoke 35 under the condition illustrated. The armature 33 is arranged to disengage from the yoke 35 when the coil MG1 is energized as the magnetic flux of the magnet 36 is annulled by the energization.

A mirror driving unit B is provided with a shaft 24. In this unit, an accumulation lever 20 and a mirror driving lever 23 are pivotally arranged to be rotatable on the shaft respectively. An interlocking lever 19 is pivotally supported by a shaft 20d which is disposed at a part of the accumulation lever 20. Meanwhile, a spring 21 urges the interlocking lever 19 to rotate clockwise as viewed on the drawing. The above stated mirror driving lever 23 is urged also clockwise by a spring 27. However, since a rising part 19b of the interlocking lever 19 is in engagement with a part 23a of the mirror driving lever 23, the accumulation lever 20, the mirror driving lever 23 and the interlocking lever 19 are urged together by a strong spring 22 in the counterclockwise direction. Further, one end 20b of the accumulation lever 20 is in engagement with a part of a locking lever 25 which is urged clockwise by a spring 26. This locking engagement prevents the accumulation lever 20 from rotating. A release lever 15 is pivotally attached to a shaft 15a and is urged in the clockwise direction by a spring 17. A mirror up signal lever 16 is pivotally attached to a shaft 16a and is urged in the counterclockwise direction by a spring 18.

A mirror 38 is arranged to guide light coming from an object to be photographed to a viewfinder optical system which is not shown. The mirror 38 is rotatable on a shaft 39 and has a pin 40 secured thereto.

Trailing shutter blades 47a, 47b and 47c are rotatably attached to arms 42 and 43. The arm 43 has one end thereof pivotally supported by a base plate 41. The arm 42 is urged in the clockwise direction by a spring which is not shown but is locked at one end thereof by a shutter locking lever 49.

There is provided an image aperture 41a in the base plate 41 of the shutter.

Leading shutter blades 48a, 48b and 48c are rotatably attached to arms 44 and 45. The arm 44 has one end thereof pivotally supported by the base plate 41. The arm 45 is urged in the clockwise direction by a spring which is not shown. The arms 42 and 45 are respectively provided with pins 42a and 45a. S       charging is effected with these pins 42a and 45a pushed in the counterclockwise direction by a part of a charge lever 46 with the force of a spring which is not shown. Under the illustrated condition, the charge lever 46 is being stopped from rotating by one end 20c of the accumulation lever 20.

While the shutter locking lever 49 is being urged in the counterclockwise direction by a spring 50, an armature 51 which is pivotally attached to the lever 49 is attracted by the yoke 53 of a magnet 54 to prevent the lever from rotating. The lever 49 is released from this attraction when the coil MG3 is energized. Meanwhile, the arm 45 is also stopped from rotating by a similar arrangement of a magnet and a locking lever which are omitted from the illustration. The attraction by the magnet is removed by energizing a coil MG2 which is not shown in FIG. 1. There is provided a switch SW4 for detecting the completion of travel made by the trailing shutter blades. The switch SW4 is normally open and is arranged to turn on when the trailing shutter blade arm 42 reaches the end of its rotation in the clockwise direction. Under the condition illustrated, the switch is still in an off state.

Figure 2:
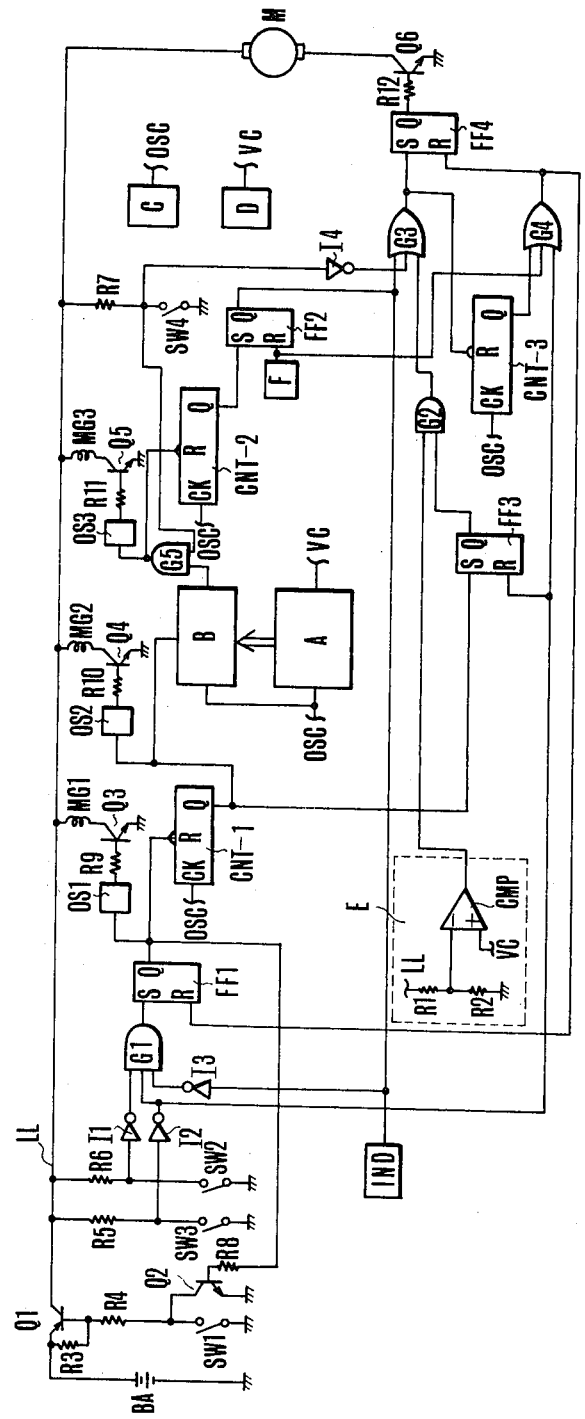
FIG. 2 is a circuit diagram showing, as a first embodiment of the invention, a driving circuit of the camera shown in FIG. 1.

A first example of an embodiment of the invention is as shown in FIG. 2, which is a circuit diagram representing the control circuit arrangement of the camera shown in FIG. 1. The control circuit includes a power source battery BA; and a light measuring, normally open switch SW1 which is arranged to turn on in response to a first stroke of a shutter release button. One end of the switch SW1 is grounded while the other end is connected through a resistor R4 to the base of a PNP transistor Q1. The transistor Q1 has a resistor R3 connected between the base and the emitter thereof. The emitter of the transistor Q1 is connected to the plus terminal of the battery BA. The collector of the transistor Q1 is connected to a power supply line LL which is provided for each of subsequent circuits.

When one frame portion of film has been completely wound up, the normally open switch SW3 turns on. One terminal of the switch SW3 is grounded while the other is connected to the line LL through a resistor R5. Another normally open switch SW2 turns on in response to a second stroke of the above stated release button. One terminal of the switch SW2 is grounded while the other is connected to the line LL through a resistor R6.

An AND gate G1 is arranged to have three inputs. One input terminal of the AND gate G1 is connected to a connection point between the switch SW2 and the resistor R6 through an inverter I1. Another input terminal of the AND gate G1 is connected through an inverter I2 to a connection point between the switch SW3 and the resistor R5. The remaining input terminal is connected through an inverter I3 to the Q output terminal of a flip-flop FF2 which will be described later. The output terminal of the AND gate G1 is connected to the set input terminal of an RS flip-flop FF1. The Q output of the flip-flop FF1 is arranged to be applied to the base of an NPN transistor Q3 through a one-shot circuit (monostable multivibrator circuit) OS1 and a resistor R9. The transistor Q3 has its emitter grounded and its collector connected to one end of a releasing magnet coil MG1. The other end of the coil MG1 is connected to the line LL. The Q output terminal of the flip-flop FF1 is connected to the reset input terminal of a counter CNT-1 and is also connected to the base of an NPN transistor Q2 through a resistor R8. The transistor Q2 is parallel connected with the switch SW1.

The Q output terminal of the counter CNT-1 is connected to the base of an NPN transistor Q4 through a one-shot circuit OS2 and a resistor R10. The magnet coil MG2 which is provided for releasing the leading shutter blades from a locked state, as mentioned in the foregoing, has one end thereof connected to the line LL and has the other end thereof grounded through the transistor Q4.

A block A represents an exposure setting circuit comprising a known light measuring circuit, an information setting circuit, etc. A block B represents a known shutter time control circuit which controls the shutter time in accordance with the output of the exposure setting circuit A. The output OSC of an oscillation circuit C is applied to the circuits A and B as clock pulses. The Q output of the above stated counter CNT-1 is supplied to the shutter time control circuit B. The shutter time control circuit B is thus arranged to produce a high level signal (hereinafter will be called an H level signal) after the lapse of a given length of time, obtained at the exposure setting circuit A, from the rising point of time of the Q output of the counter CNT-1. An AND gate G5 is arranged to have two inputs. One input terminal of the AND gate G5 is connected to the output terminal of the above shutter time control circuit. A reference symbol SW4 indicates the above stated switch for detecting completion of the travel of the trailing shutter blades. The switch SW4 is normally open and comes to turn on when the trailing shutter blades come close to the end of their travel. One terminal of the switch SW4 is grounded while the other is connected to the line LL through a resistor R7.

Meanwhile, a connection point between the resistor R7 and the switch SW4 is connected to the input terminal of the AND gate G5. The output terminal of the AND gate G5 is connected to the base of an NPN transistor Q5 through a one-shot circuit OS3 and a resistor R11. A symbol MG3 indicates the coil of the electromagnet provided for releasing the trailing shutter blades from a locked state. One end of the coil MG3 is connected to the line LL while the other is grounded through the transistor Q5. The output of the AND gate G5 is further connected to the reset input terminal of a counter CNT-2 which is provided for the purpose of detecting abnormalities. The Q output terminal of the counter CNT-2 is connected to the set input terminal of an RS flip-flop FF2. The Q output of this flip-flop FF2 is arranged to be supplied to a 3 input OR gate G3 and also to the AND gate G1 through an inverter I3. The output terminal of the flip-flop FF2 is also connected to a display means IND such as a light emitting diode or a sound producing element. Meanwhile, another input terminal of the gate G3 has the connection point between the switch SW4 and the resistors R7 connected to it through an inverter IV. Further, the Q output terminal of the counter CNT-1 is connected to the set input terminal of the RS flip-flop FF3. The Q output terminal of the flip-flop FF3 is connected to one of the two input terminals of an AND gate G2. The output terminal of this gate G2 is connected to one of the input terminals of the OR gate G3. A block E represents a power source voltage detecting circuit including voltage dividing resistors R1 and R2 which are connected between the line LL and the ground. A connection point between the two resistors is connected to an inverting input terminal of a comparator CMP. The comparator CMP has a reference voltage Vc impressed on its non-inverting input terminal. When the power source voltage becomes lower than a predetermined level, the comparator CMP produces an H level signal. The reference voltage Vc is the output of a constant voltage circuit D. The output terminal of the comparator CMP is connected to one of the input terminals of the AND gate G2. The output of the OR gate G3 is impressed on the set input terminal of an RS flip-flop FF4. The Q output of the flip-flop FF4 is arranged to be supplied to the base of an NPN transistor Q6 through a resistor R12. A symbol M indicates the motor which is shown in FIG. 1. One terminal of the motor M is connected to the line LL while the other is grounded through the transistor Q6.

The output terminal of the OR gate G3 is further connected to the reset input terminal of a counter CNT-3. The Q output terminal of the counter is connected to one of the three input terminals of an OR gate G4. The output terminal of the gate G4 is in turn connected to the reset terminals of the flip-flops FF1 and FF4.

A block F represents a reset pulse generating circuit which is arranged to produce reset pulses when the power source is switched on. The output terminal of the pulse generating circuit F is connected to the reset terminal of the flip-flop FF2 and also to one of the input terminals of the OR gate G4.

Further, the output terminal of the inverter I2 is connected to the reset input terminal of the flip-flop FF3 and to one of the input terminals of the OR gate G4. The CK terminals of the counters CNT-1, CNT-2 and CNT-3 are clock pulse input terminals which are arranged to receive the pulse signal OSC produced from the oscillation circuit C.

The camera illustrated in FIGS. 1 and 2 operates in the following manner. A depressing operation on the shutter button first causes the switch SW1 to turn on. This in turn causes the transistor Q1 to turn on to initiate a supply of power to the whole circuitry. Then, reset pulses are produced from the reset pulse generating circuit F to reset the flip-flops FF1, FF2 and FF4.

Under the winding completed condition as shown in FIG. 1, the switch SW3 is on. Therefore, flip-flop FF3 is also reset through the inverter I2.

Accordingly, the Q output of each flip-flop comes to a low level (hereinafter will be called an L level).

When the shutter button is further depressed, the switch SW2 turns on. Since the winding completion detecting switch SW3 is on under the winding completed condition as mentioned in the foregoing, and since the Q output of the flip-flop FF2 is at an L level, the level of the output of the AND gate G1 becomes an H level. This causes the Q output of the flip-flop FF1 to change to an H level, which in turn causes the transistor Q2 to turn on through the resistor R8. With the transistor turned on, the power supply is maintained even after the switch SW1 is turned off by releasing the shutter release button from the depressing operation. Further, when the level of the output of the flip-flop FF1 becomes an H level, the counter CNT-1 begins to count. At the same time, the level of the output of the one-shot circuit OS1 becomes an H level, which causes the transistor Q3 to turn on to energize the releasing magnet coil MG1.

Accordingly, the attraction force of the permanent magnet 36 shown in FIG. 1 is caused to disappear by the magnetic flux of the coil MG1. This allows the start 31 to be rotated clockwise by the spring 32. The lever 31 thus comes into contact with the locking lever 25 and further causes the lever 25 to rotate counterclockwise against the force of the spring 26. This releases the locking lever 25 and the accumulation lever 20 from locking to permit the interlocking lever 9, the mirror driving lever 23 and the accumulation lever 20 to be rotated together counterclockwise by the force of the spring 22. Since one end 23b of the mirror driving lever 23 comes to push up the pin 40 during this rotation, this causes the mirror 38 to swing on the shaft 39 in the direction of an arrow shown in the drawing. Further, the rising part 23c of the mirror driving lever 23 pushes the rising part 29b of the stopping down lever 29. This pushing action causes the stopping down lever 29 to rotate clockwise against the force of the spring 30. During the clockwise rotation, the falling part 29a of the stopping down lever 29 pushes the stopping down member of a lens which is not shown. Accordingly, the lens is stopped down to a preset aperture value. Further, an upward movement of one end 20c of the accumulation lever 20 then enables the charge lever 46 to be rotatable counterclockwise by the force of a spring which is not shown. The charge lever 46 thus retracts from the ranges of movement of the pins 42a and 45a provided on the arms 42 and 45. During the latter half of the mirror lifting process, the pin 40 which is secured to the mirror 38 comes to abut on the mirror up signal lever 16 to cause the lever 16 to rotate clockwise against the force of the spring 18. Then, this causes the lever 8 to rotate counterclockwise against the force of the spring 10. With the lever 8 rotated counterclockwise, the projection 8a retracts from the notch 6a of the notched plate 6. At the same time, the switch SW3 which has been pushed by the part 8b of the lever 8 comes to turn off.

The counter CNT-1 counts a number of clock pulses corresponding to a length of time required for completion of the sequence of driving actions of the mechanisms described in the foregoing. THe level of the Q output of the counter CNT-1 changes from an L level to an H level when the counter counts the predetermined number of pulses. The H level output then triggers the one-shot circuit OS2 to energize the leading shutter blade unlocking coil MG2 for a predetermined period of time. Then, concurrently with this, a counting operation begins at the shutter time control circuit B. Further, the flip-flop FF3 is set. However, the output of the gate G2 remains at an L level if the output of the power source voltage detecting circuit E is at an L level.

In the arrangement shown in FIG. 1, therefore, a locking lever which is not shown is released to allow the leading shutter blade arm 45 to be rotated clockwise by a spring which is not shown. The leading shutter blades 48a, 48b and 48c then move away from the image aperture 41a of the shutter base plate 41 to initiate an exposure. After the lapse of a correct exposure time set by the exposure setting circuit A, the output of the shutter time control circuit B changes from an L level to an H level.

Further, the switch SW4 which is arranged to detect completion of the travel by the trailing blades is off at this point of time. Therefore, the output of the AND gate G5 changes to an H level to have the one-shot circuit OS3 produce an H level signal for a predetermined period of time. Therefore, the trailing blade unlocking magnet coil MG3 is energized. Meanwhile, the abnormality detecting counter CNT-2 begins to count in response to the H level signal produced from the AND gate G5.

Then, the attraction force exerted by the permanent magnet 54 is annulled by the magnetic flux generated at the coil MG3 shown in FIG. 1. The trailing shutter blade locking lever 49 is thus caused to rotate counterclockwise by the force of the spring 50 to release the trailing shutter blade arm 42 from the locked state thereof. The trailing blade arm 42, therefore, is caused to rotate clockwise by a spring which is not shown. The trailing shutter blades 47a, 47b and 47c then come to cover the image aperture 41a of the shutter base plate 41 to terminate the exposure.

The abnormality detecting counter CNT-2 is arranged to carry on its count over a length of time which is a little longer than the length of time required for completion of the travel by the trailing shutter blades after the trailing blade driving signal is obtained from the AND gate G5. In cases where the trailing shutter blades travel in a normal manner, therefore, the level of the output of the AND gate G5 becomes an L level with the trailing blade travel completion switch SW4 closed by the rising part of the trailing blade arm immediately before completion of the travel. The L level output of the AND gate G5 resets the counter CNT-2 to stop it from counting. The level of the output of the OR gate G3 then becomes high to set the flip-flop FF4. This causes the level of the output of the flip-flop FF4 to become high to render the transistor Q6 operative and the winding motor M receives power. With the power supply effected to the winding motor M shown in FIG. 1, the shaft 4 is rotated in the direction of an arrow through the gears 2 and 3. When the cam part 7a of the cam 7 causes the lever 9 to rotate clockwise against the force of the spring 10 at the early stage of the rotation, one end 9b of the lever 9 pushes the release lever 15 to cause it to rotate counterclockwise against the force of the spring 17. The other end of the release lever 15 then comes to push the part 19a of the interlocking lever 19. The interlocking lever 19 rotates counterclockwise against the force of the spring 21 to disengage the driving lever 23. This allows the driving lever 23 to be rotated clockwise by the spring 27. Then, the mirror 38 which has been lifted up in the direction of an arrow by way of the pin 40 is caused to come back to the state as illustrated in FIG. 1. Further, the stopping down lever 29 which has been pushed by a part 23c of the mirror driving lever 23, is then caused by the force of the spring 30 to rotate counterclockwise back to the state as illustrated in FIG. 1. The lens is opened by this operation after its stopped down state. The mirror up signal lever 16 which has been pushed by the pin 40 is also allowed to come back to its original position. The lever 8 is pushed against the notched plate 6 by the spring 10. However, since the notched plate 6 has already rotated by then, the projection 8a of the lever 8 does not immediately come to engage the notch 6a and thus allows the shaft 4 to further rotate. The winding cam 5 pushes the pin 11 to cause the charge lever 12 to rotate clockwise. The pin 13 then pushes the charge lever 28 to cause it to rotate counterclockwise. The part 20a of the accumulation lever 20 is pushed by this to cause it to rotate clockwise against the force of the spring 22. Concurrently with this, the pin 28a provided on the charge lever 28 pushes the part 31a of the start lever 31 to cause the lever 31 to rotate counterclockwise against the force of the spring 32. This in turn allows the locking lever 25 to be brought back to the position shown in FIG. 1 by the force of the spring 26. Then, the locking lever 25 again engages the part 20b of the accumulation lever 20 which comes there by rotating clockwise. Meanwhile, the part 20c of the accumulation lever 20 charges the charge lever 46 in the clockwise direction to bring the shutter blades back to the positions shown in FIG. 1 through the arms 42 and 45. The interlocking lever also comes back to the state as shown in FIG. 1, thus to engage the part 23a of the mirror driving lever 23. The blade locking lever is also brought back to the state as shown in FIG. 1 by a charge mechanism which is not shown. Upon completion of winding, the projection 8a of the lever 8 falls in the notch 6a of the notched plate 6 to stop the shaft 4 from rotating. Meanwhile, the part 8b of the lever 8 pushes the winding completion switch SW3 into a closed state. This causes the level of the output of the inverter I2 shown in FIG. 2 to become an H level. This output resets the flip-flop FF3 and, at the same time, also resets the flip-flop FF1 and FF4 through the OR gate G4 so as to stop the power supply to the motor. Further continuation of the depressing operation on the release button under this condition causes the above-described processes to be repeated to effect an exposure.

Next, when the trailing shutter blades do not work in a normal manner, operations take place in the same manner as in the normal case until the trailing blade unlocking magnet coil MG3 is energized, after the switch SW1 in turned on, and the counter CNT-2 begins to count. However, since the trailing blade travel completion switch SW4 does not close unless the trailing shutter blades travel, the counter CNT-2 counts the above stated predetermined number of pulses (a predetermined length of time), and then the output Q of the counter CNT-2 changes from an L level to an H level. Therefore, the flip-flop FF4 is set through the OR gate G3 to forcibly effect a supply of power to the motor M. Then, with the motor operated in this manner, the winding operations including the descent of the mirror 38, the closing actions of the shutter blades 47a, 47b and 47c, etc., are carried out as described above.

Further, when the output of the flip-flop FF2 changes from an L level to an H level, this causes the level of the input to the AND gate G1 through the inverter I3 to become an L level and the AND gate G1 is then closed. Therefore, even if the winding completion switch SW3 is closed by a continuous depressing operation on the shutter release button, the aforementioned closed state of the AND gate G1 inhibits the next sequence of release operations to inform the camera operator of the abnormality.

In this particular embodiment, the camera is arranged to detect only malfunctions of the trailing shutter blades. However, malfunctions of the leading shutter blades can be likewise detected, by the provision of a similar travel completion detecting switch SW5 (FIGS. 3 and 4) for the leading shutter blades.

Figure 3:
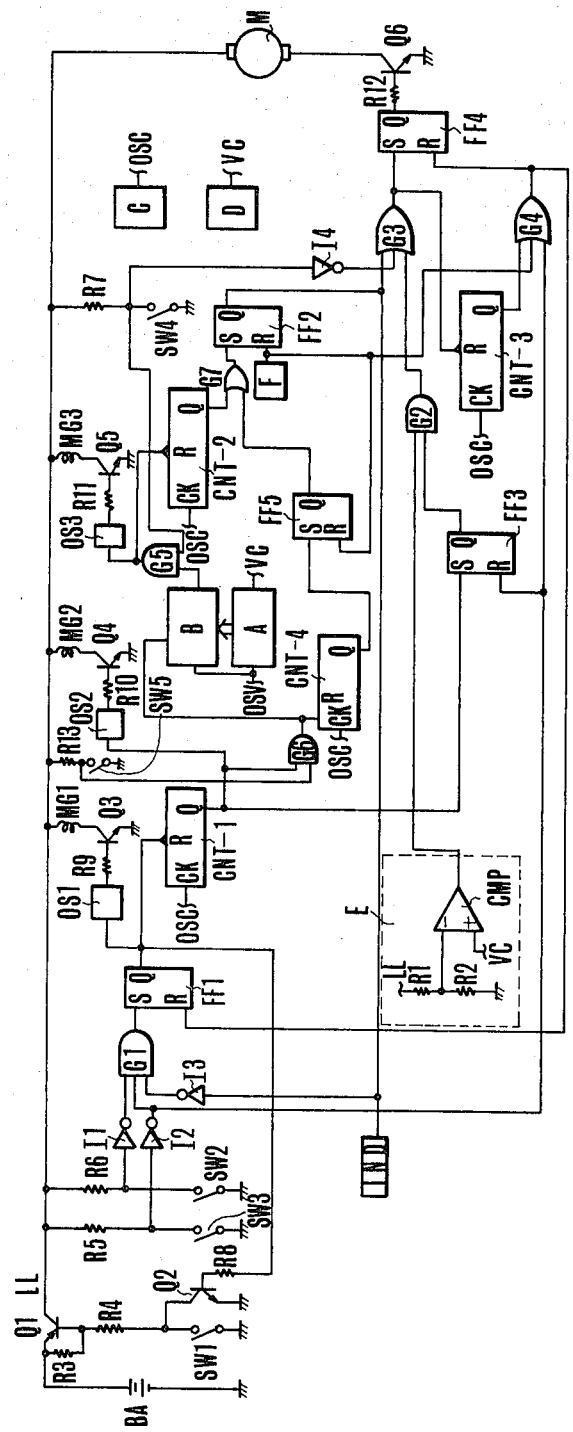
FIG. 3 is a circuit diagram showing a second embodiment of the invention.
Figure 4:
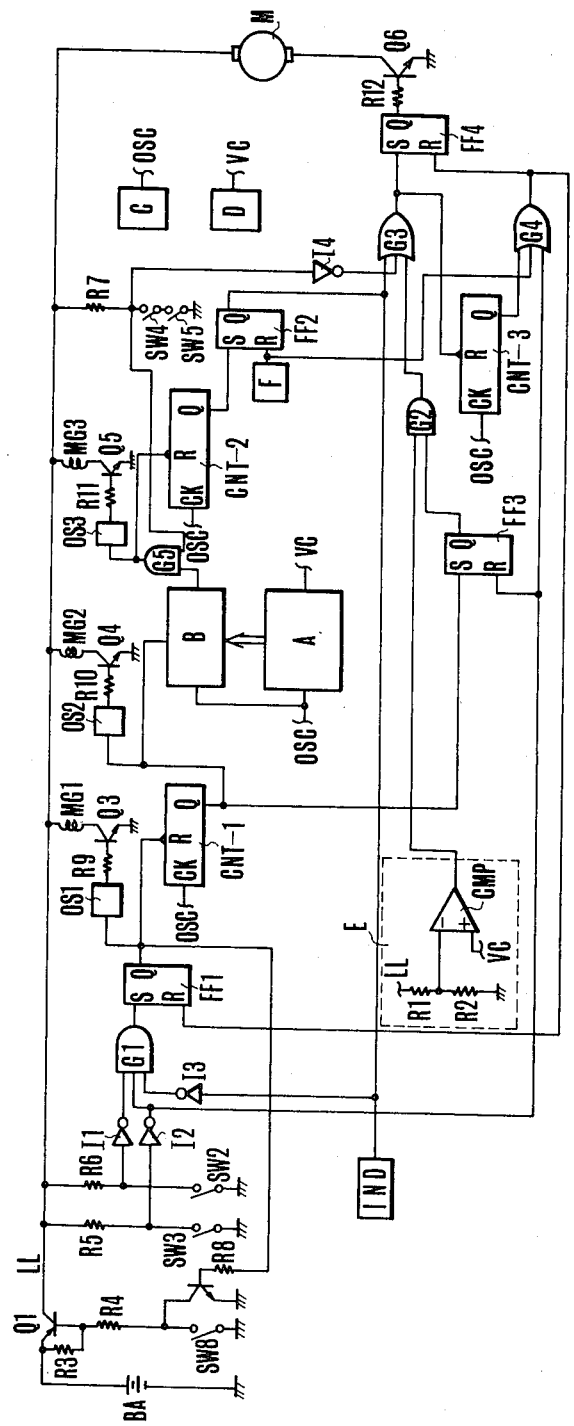
FIG. 4 is another circuit showing a third embodiment of the invention.

FIGS. 3 and 4 show by way of example control circuits of embodiments having a switch SW5 for detecting completion of travel by leading shutter blades, respectively. In the case of the embodiment shown in FIG. 3, a counter CNT-4, a flip-flop FF5, an AND gate G6, an OR gate G7, a resistor R13 and a leading shutter blade travel completion detecting switch SW5 are added to the circuitry shown in FIG. 2. The following description is limited to details of differences from the circuitry shown in FIG. 2.

One terminal of the leading blade travel completion detecting switch SW5 is grounded while the other is connected to the line LL through the resistor R13. The AND gate G6 has two input terminals. One input terminal of the AND gate G6 is connected to the output terminal of the counter CNT-1 while the other input terminal is connected to a connection point between the above stated switch SW5 and the resistor R13.

The trigger input terminal of the shutter time control circuit B is connected to the output terminal of the gate G6 instead of being connected to the Q output terminal of the counter CNT-1. Further, the output terminal of the gate G6 is connectable to the reset input terminal of the counter CNT-4. The Q output terminal of the counter CNT-4 is connected to the set input terminal of the flip-flop FF5. The Q output terminal of the flip-flop FF5 is connected to one of the two input terminals of the OR gate G7.

The OR gate G7 has the other input terminal thereof connected to the Q output terminal of the counter CNT-2. The output terminal of the gate G7 is connected to the set input terminal of the flip-flop FF2.

The reset input terminal of the flip-flop FF5 is connected to the above stated reset pulse generating circuit F. Such being the arrangement, when the leading blade driving signal is produced as an H signal from the counter CNT-1, the leading blade unlocking magnet coil MG2 is energized to have the leading shutter blades driven.

Since the leading blade travel completion detecting switch SW5 does not turn on immediately after the change of the output of the counter CNT-1 to an H level, an H level signal is produced from the gate G6 to cause the counter CNT-4 to begin its count and the shutter time control circuit B is triggered.

In cases where the leading shutter blades travel in a normal manner, the switch SW5 comes to turn on before completion of the count by the counter CNT-4. Therefore, the gate G6 is closed to stop the count of the counter CNT-4. Then, after the lapse of a predetermined length of time, an H level is produced from the shutter time control circuit to drive the trailing shutter blades in the same manner as in the case of the circuitry shown in FIG. 2.

If the leading shutter blades fail to completely travel, the switch SW5 would not be closed. In that event, the counter CNT-4 completes its count and the Q output thereof changes from an L level to an H level. The flip-flop FF5 is set by this and the Q output of the flip-flop FF5 changes to an H level. Accordingly, the OR gate G7 opens. The level of the input to the flip-flop FF2 becomes an H level to effect power to the winding motor and, at the same time, a next sequence of release action for continuous photographing are inhibited in the same manner as in the preceding embodiment.

In another embodiment which is shown in FIG. 4, the leading blade travel completion detecting switch SW5 is connected in series with the trailing blade travel completion detecting switch SW4 shown in FIG. 2. In this case, although the length of time required for the travel of the leading shutter blades, from the issue of the leading blade start signal till the completion of the travel by the leading shutter blades, is not arranged to be detected, the embodiment is arranged to operate as follows. The power supply to the motor through the inverter I4, the OR gate G3 and the flip-flop FF4 is not effected if the travel by the leading shutter blades has not been completed when the travel by the trailing shutter blades is completed. In the same manner as in the case where the trailing shutter blades fail to travel, therefore, an H level signal is produced from the counter CNT-2 to set the flip-flop FF2 and thereby drive the motor. Meanwhile, the next sequence of release actions for continuous photographing are inhibited by the inverter I3. This arrangement of the embodiment thus permits detection of a malfunction of the leading shutter blades as well as that of the trailing shutter blades.

Permanent magnets are employed as shutter control magnets in the embodiments described in the foregoing. However, the invention is not limited to the arrangement of the specific embodiments thereof. It will be obvious to those skilled in the art that the arrangement may be replaced with a shutter using electromagnets of the type arranged to produce a mechanical signal by attracting an armature at the start of energization, or of the type arranged to detach the armature when energization ceases.

What is claimed is:
1. A camera comprising:
(a) shutter means, including at least one shutter blade, movable between a first position to initiate an exposure and a second position to terminate the exposure;
(b) signal producing means for producing a signal for moving said shutter blade to the second position;
(c) detecting means for producing a signal in response to completion of travel by said shutter blade to the second position;
(d) first advance means responsive to the signal from said detecting means for advancing said shutter blade to a first position;
(e) timer means for beginning a delay operation in response to the signal from said signal producing means and for producing a signal after the lapse of a length of time required for completion of travel by said shutter blade to the second position; and

(f) second advance means responsive to the signal from the timer means for forcibly advancing said shutter blade to the first position in the absence of the signal from said detecting means.

2. A camera comprising:
(a) shutter means, including at least one shutter blade, movable between a first position to initiate an exposure and a second position to terminate the exposure;
(b) signal producing means for producing a signal for moving said shutter blade to the second position;
(c) detecting means for producing a signal in response to completion of travel by said shutter blade to the second position;
(d) first advance means responsive to the signal from said detecting means for advancing said shutter blade to a first position;
(e) timer means for beginning a delay operation in response to the signal from said signal producing means and for producing a signal after the lapse of a length of time required for completion of travel by said shutter blade to the second position; and
(f) second advance means responsive to the signal from the timer means for forcibly advancing said shutter blade to the first position in the absence of the signal from said detecting means, said second advance means being operatively connected to the detecting means to be reset to an initial condition.

3. A camera according to claim 2, wherein said timer means includes a counter having a reset terminal operatively connected to the detecting means.

4. A camera according to claim 2, wherein said second advance means includes a winding motor functionally coupled with the shutter blade.

5. A camera comprising:
(a) shutter means including a first movable shutter blade for initiating an exposure and a second movable shutter blade for terminating the exposure;
(b) signal producing means for producing a signal for moving said second movable shutter blade;
(c) detecting means for producing a signal in response to completion of travel by the second movable shutter blade to a predetermined position;
(d) first advance means responsive to the signal from said detecting means for advancing said second movable shutter blade to an initial position;
(e) timer means for beginning a delay operation in response to the signal from said signal producing means and for producing a signal after the lapse of a length of time required for completion of travel by said second movable shutter blade; and
(f) second advance means responsive to the signal from the timer means for forcibly advancing said second movable shutter blade to an initial position in the absence of the signal from said detecting means.

6. A camera according to claim 5, wherein said timer means includes a counter having a reset terminal operatively connected to the detecting means.

7. A camera according to claim 5, wherein said second advance means includes a winding motor functionally connected with the second movable shutter blade.

8. A camera comprising:
(a) shutter means including a first movable shutter blade for initiating an exposure and a second movable shutter blade for terminating the exposure;
(b) signal producing means for producing a signal for moving said first movable shutter blade;
(c) detecting means for producing a signal in response to completion of travel by the first movable shutter blade to a predetermined position;
(d) timer means for beginning a delay operation in response to the signal from said signal producing means and for producing a signal after the lapse of a length of time required for completion of travel by said first movable shutter blade; and
(e) advance means responsive to the signal from the timer means for forcibly advancing said first movable shutter blade to an initial position in the absence of the signal from said detecting means.

* * * * *